United States Patent
Hong (10) Patent No.: US 6,929,206 B2
(45) Date of Patent: Aug. 16, 2005

(54) METHOD AND APPARATUS FOR CONTROLLING SPEED IN RECORDING/REPRODUCING APPARATUS

(75) Inventor: Sung Pyo Hong, Suwon-si (KR)

(73) Assignee: LG Electronics Inc., Seoul (KR)

( * ) Notice: Subject to any disclaimer, the term of this patent is extended or adjusted under 35 U.S.C. 154(b) by 72 days.

(21) Appl. No.: 10/303,713

(22) Filed: Nov. 26, 2002

(65) Prior Publication Data

US 2003/0168543 A1 Sep. 11, 2003

(30) Foreign Application Priority Data

Mar. 7, 2002 (KR) ................................ 10-2002-0012273

(51) Int. Cl.⁷ .............................................. G03B 21/50
(52) U.S. Cl. ................................................. 242/334.1
(58) Field of Search ............................ 242/334, 334.1, 242/334.2, 334.3, 334.5; 360/73.01, 73.06

(56) References Cited

U.S. PATENT DOCUMENTS

| | | | | |
|---|---|---|---|---|
| 4,407,463 A | * | 10/1983 | Ashida ..................... | 242/334.1 |
| 4,478,376 A | * | 10/1984 | Sakaguchi et al. ........ | 242/334.1 |
| 5,138,504 A | * | 8/1992 | Nishijima et al. ........ | 360/73.06 |
| 5,398,880 A | * | 3/1995 | Sawai et al. .............. | 242/334.1 |
| 5,803,387 A | * | 9/1998 | Mace ....................... | 242/334.4 |
| 5,839,683 A | * | 11/1998 | Kijima et al. ............. | 242/334.2 |
| 6,089,485 A | * | 7/2000 | Kijima et al. ............. | 242/334.2 |
| 6,158,682 A | * | 12/2000 | Kijima et al. ............. | 242/334.2 |
| 6,305,629 B1 | * | 10/2001 | Chliwnyj et al. ......... | 242/334.3 |
| 6,315,229 B1 | * | 11/2001 | Miyahara .................. | 242/334.1 |
| 6,450,433 B1 | * | 9/2002 | Fujii ........................ | 242/334.4 |

\* cited by examiner

*Primary Examiner*—William A. Rivera
(74) *Attorney, Agent, or Firm*—Fleshner & Kim, LLP (57) ABSTRACT

A method and apparatus can control a tape speed in a magnetic tape recording/reproducing apparatus. The method can include operating the brake unit at a determined operating point to reduce the rotating speed of the supply or take-up reel, sensing the rotating speed of the capstan motor during the speed reduction by the brake unit at least two times to calculate when the rotating speed of the capstan motor substantially operates at a reduced target rotating speed, and stopping the braking operation of the brake unit based on the calculated time point. The method and apparatus can selectively achieve a rapid high-speed winding operation while reducing or preventing damage to the tape, and to achieve an accurate control substantially irrespective of surrounding conditions.

23 Claims, 9 Drawing Sheets

METHOD AND APPARATUS FOR CONTROLLING SPEED IN RECORDING/ REPRODUCING APPARATUS

BACKGROUND OF THE INVENTION

1. Field of the Invention

The present invention relates to a recording/reproducing apparatus.

2. Background of the Related Art

A recording/reproducing apparatus can include a magnetic tape recording/reproducing apparatus. A magnetic tape recording apparatus is a device for selectively magnetizing a magnetic tape by use of a magnetic head while running the magnetic tape along a tape running system to record or reproduce recorded audio and/or video signals on the tape. Where such a magnetic tape recording apparatus operates to record signals or reproduce recorded signals on a tape, the tape is unwound from a supply tape reel, and then wound around a take-up tape reel while running along the tape recording apparatus.

When the unwound tape is completely wound around the take-up tape reel, it is impossible to perform recording and reproduction of signals. The recording and reproduction of signals can be achieved after the tape is wound again around the supply tape reel. The operation of winding the tape from the take-up tape reel to the supply tape reel is carried out at a high speed. Of course, such a high-speed winding operation may be to transfer the tape from the supply tape reel to the take-up tape reel in order to record or reproduce signals starting from a particular point on the tape.

At the point of time when the tape is completely wound around the supply tape reel or take-up tape reel at a high winding speed, a high tension is temporarily applied to the tape at the trailing tape end connected to the unwinding-side tape reel. In severe cases, the connection between the tape and the unwinding-side tape reel may be severed by the tension.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a speed control method and apparatus that is capable of operating at an increased speed.

Another object of the present invention is to provide a speed control method and apparatus that can wind a tape in a tape cassette used for use in a magnetic tape recording/reproducing apparatus without causing any damage to the tape.

Another object of the present invention is to provide a speed control method and apparatus that is capable of reducing or avoiding any tape or media loosening.

Another object of the invention is to provide a tape speed control method and apparatus that is capable of winding at a high speed without being influenced by surrounding conditions.

To achieve at least the above objects and other advantages in a whole or in part and in accordance with the purpose of the present invention, as embodied and broadly described herein, there is provided an apparatus that includes a supply mechanism configured to operate in a high speed winding mode and a fast forward/rewind mode, a driving motor configured to drive the supply mechanism at a first speed in the high speed winding mode, wherein the first speed is higher than a speed in the fast forward/rewind mode, a brake mechanism that reduces a speed of the supply mechanism from the first speed to a second speed, and a control circuit that controls the brake mechanism during the reduction of the supply mechanism speed from the first speed to the second speed.

To further achieve at least the above objects and other advantages in a whole or in part and in accordance with the purpose of the present invention, as embodied and broadly described herein, there is provided a method that includes driving a capstan motor at a first speed, braking to reduce the speed of the capstan motor to a second speed, releasing the braking operation so that the capstan motor substantially achieves the second speed, wherein the first speed is higher than the second speed, wherein both the first and second speed are greater than a play mode speed.

To further achieve at least the above objects and other advantages in a whole or in part and in accordance with the purpose of the present invention, as embodied and broadly described herein, there is provided a method for controlling operations in a high-speed winding mode for a recording/reproducing apparatus that includes supply and take-up reels adapted to rotate selectively in accordance with a driving force from a motor, the method including performing high-speed winding by increasing the rotating speed of the motor to a target speed according to a high-speed winding request, braking while calculating a point of time when the rotating speed of the motor reaches a reduction target speed, and releasing the braking on the basis of the calculated point of time, and stopping the motor after driving the motor at the reduction target speed during a desired time.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
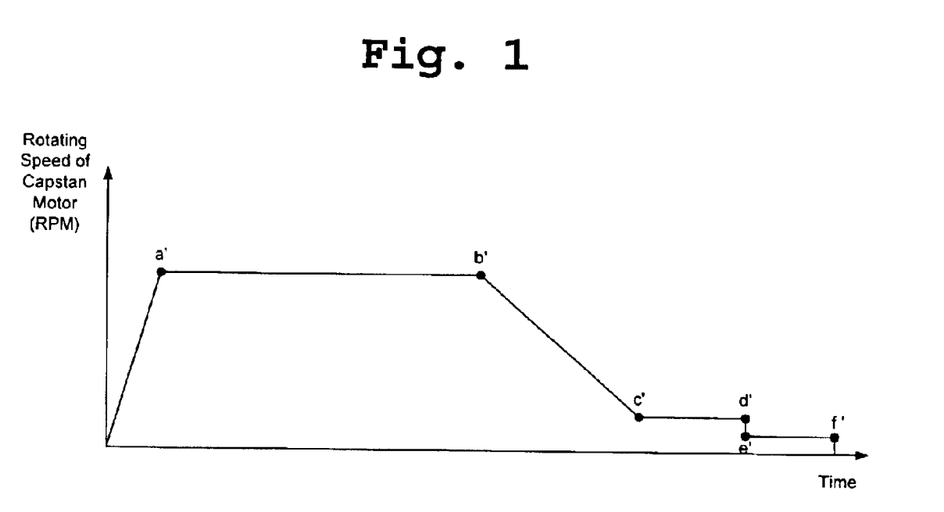
FIG. 1 is a speed graph that shows a method for controlling a tape speed in a high-speed winding mode in a magnetic tape recording/reproducing apparatus.

As shown in FIG. 1, the rotating speed of a capstan motor adapted to supply a driving force for tape winding can be controlled in a high-speed tape winding mode. In an initial stage, its rotating speed is abruptly increased until a time point a'. The capstan motor is maintained at the increased speed until a time point b'. The time point b' is preferably the point of time when the remaining tape amount on the tape reel of a tape cassette fitted around a driven-side reel (that is, a supply reel in a fast forward (FF) mode, or a take-up reel in a rewind (REW) mode) corresponds to a predetermined value.

From the time point b', the capstan motor can be controlled to gently reduce its rotating speed (e.g., in an interval b'-c'). When the rotating speed of the capstan motor is reduced to a predetermined value, the capstan motor is controlled to rotate at a constant speed corresponding to the predetermined value (e.g., in an interval c'-d'). Subsequently, the rotating speed of the capstan motor can be further reduced so that the capstan motor is rotated at a constant speed corresponding to the reduced speed (e.g., in an interval e'-f'). The capstan motor is then stopped.

However, the time taken to reduce the rotating speed of the capstan motor to a predetermined speed at point c' is lengthened because the speed reduction interval b'-c', in which a reduction in the rotating speed of the capstan motor is carried out, is relatively long. For this reason, there is a severe restriction in realizing a high-speed winding operation at a very high speed, for example, about 500 times-speed. The "500 times-speed" means a speed in which 43.2 seconds are taken to completely wind a video tape from one reel to another reel in a video tape cassette having a tape length corresponding to a playback time of 120 minutes in a standard play mode and a playback time of 360 minutes in an extended play mode. The speed at which such a tape length is completely wound in one minute can also be called a "360 times-speed".

Further, when the speed reduction is carried out in accordance with the speed reduction program of FIG. 1, tape loosening can occur in the interval b'-c' because of a load deviation depending on the tape length of the tape cassette, a load deviation of the reel driving unit or tape running system in the deck, or a torque deviation of the capstan motor. In addition, the tension of the tape may be varied in accordance with a variation in the surrounding conditions such as the temperature or humidity where the magnetic tape recording/reproducing apparatus is placed, so that tape loosening may occur in the interval b'-c' in FIG. 1 because of a variation in the running interval of the reel.

Figure 2:
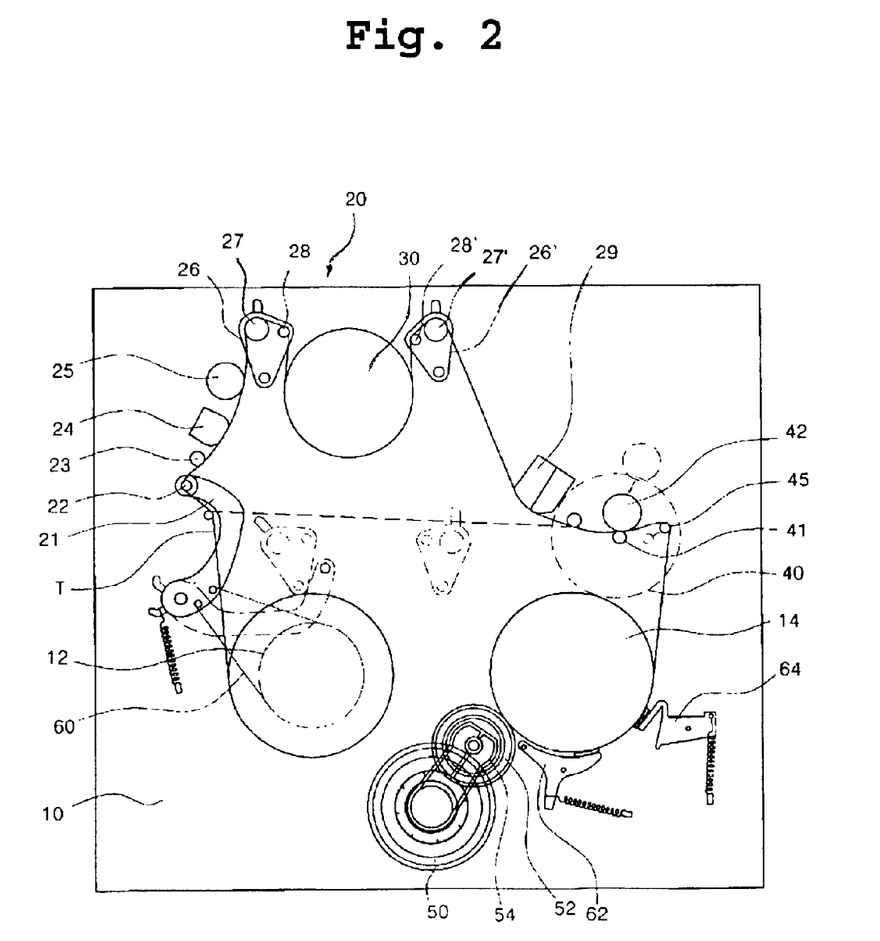
FIG. 2 is a diagram that shows a plan view illustrating a preferred embodiment of a deck included in a magnetic tape recording/reproducing apparatus according to the present invention.

Preferred embodiments of methods and apparatus that control speed in a high-speed winding mode in a recording/reproducing apparatus in accordance with the present invention will now be described. A preferred embodiment of an apparatus adapted to run a tape that can be provided at a main chassis in a magnetic tape recording/reproducing apparatus according to the present invention is shown in FIG. 2. The apparatus shown in FIG. 2 can be a deck used in a magnetic tape recording/reproducing apparatus to which preferred embodiments of methods for controlling tape speed may be applied.

As shown in FIG. 2, a supply reel 12 adapted to drive the supply tape reel of a tape cassette and a take-up reel 14 adapted to drive the take-up tape reel of the tape cassette are mounted to a main chassis 10 spaced apart from each other by a desired distance. A tape running system 20 is also preferably mounted on the main chassis 10 in order to guide the running of a tape T emerging from the tape cassette. The tape running system 20 can include a plurality of posts 22, 23, 28, 28' and 45, and rollers 25, 27, 27' and 42. A head drum 30 is arranged at an intermediate position in the tape running system 20. The tension post 22 can be mounted on a tension lever 21 and adapted to adjust the tension of the tape T. The posts 28 and 28' are slant posts mounted on slant bases 26 and 26' preferably sliding on the main chassis 10, respectively, in order to wind the tape T on the head drum 30. In accordance with the sliding movements of the slant bases 26 and 26', the tape T can be drawn out from the tape cassette corresponding to a full-width erase head 24, and an audio/control head 29.

The drive power for running the tape T is preferably provided by a capstan motor 40. The capstan motor 40 has a capstan shaft 41 protruded from the main chassis 10 in a direction away from the capstan motor 40. The capstan shaft 41 guides the tape T running along the tape running system 20 in cooperation with the roller 42 (e.g., a pinch roller).

A clutch assembly 50 is preferably arranged between the supply reel 12 and the take-up reel 14 to transfer the drive power from the capstan motor 40 to drive the supply reel 12 or take-up reel 14 at a constant torque, irrespective of the amount of the wound tape remaining on the associated supply tape reel or take-up tape reel. An idler gear 52 is mounted to one end of an idler arm 54, which is coaxially mounted at the other end thereof to the clutch assembly 50. The idler gear 52 is selectively coupled to the supply reel 12 or take-up reel 14, thereby transmitting the drive power received from the clutch assembly 50 to the coupled reel.

A tension brake unit 60 can be installed at the supply reel 12. The tension brake unit 60 controls the rotating speed of the supply reel 12 in accordance with the tension of the tape T. A separate reel brake unit (not shown) may also be installed at the supply reel 12 in order to control the rotating speed of the supply reel 12.

A system for controlling the rotating speed of the take-up reel 14 will now be described. A first brake unit 62 can control the rotating speed of the take-up reel 14 to adjust the tension of the tape T, and a second brake unit 64 can control the rotating speed of the take-up reel 14. The first and second brake units 62 and 64 are driven by a function plate (not shown). The function plate operates, by the drive power from a loading motor, in different fashions in accordance with different operation modes (that is, a play mode, a record mode, a fast forward mode, and a rewind mode, etc.).

The first brake unit 62 controls the rotating speed of the take-up reel 14 to maintain a constant tension of the tape T in a reverse running mode. The second brake unit 64 serves to stop the take-up reel 14 or to reduce the rotating speed of the take-up reel 14 when the operation mode is switched from a running mode or high-speed winding mode to a stop mode.

As shown in FIG. 2, the tape T is preferably run as indicated by the solid line in a general running mode (that is, a play mode or a record mode), while being run as indicated by the phantom line in a high-speed winding mode (that is, a fast forward mode or a rewind mode).

Figure 3:
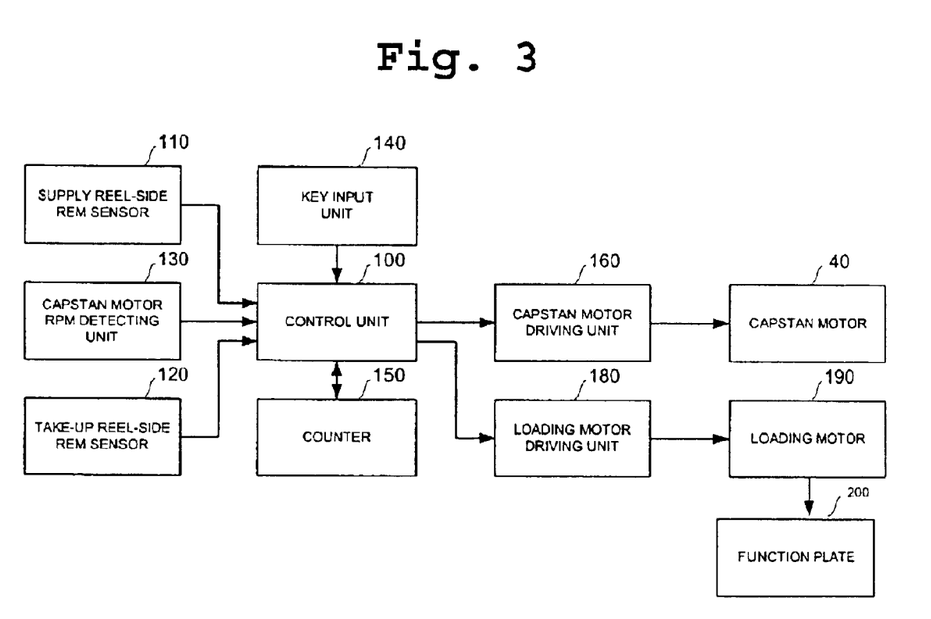
FIG. 3 is a block diagram illustrating a preferred embodiment of a circuit configuration for running a tape in a magnetic tape recording/reproducing apparatus according to the present invention.

FIG. 3 is a block diagram that shows a preferred embodiment of a circuit configuration that drives a magnetic tape recording/reproducing apparatus. Preferred embodiments of methods for controlling recording/reproducing can be performed using the circuit configuration of FIG. 2.

As shown in FIG. 3, a supply reel-side remaining tape amount sensor 110 (not shown in FIG. 2) can be arranged at the main chassis 10 beneath the supply reel 12 to detect the remaining amount of the tape wound on the supply tape reel of the tape cassette fitted around the supply reel 12. A take-up reel-side remaining tape amount sensor 120 can be arranged at the main chassis 10 beneath the take-up reel 14 to detect the remaining amount of the tape wound on the take-up tape reel of the tape cassette fitted around the take-up reel 14. A capstan motor RPM detecting unit 130 can serve to detect the RPM of the capstan motor 40.

As shown in FIG. 3, a key input unit 140 preferably serves to set various operation modes (e.g., the play mode, the record mode, the fast forward mode, and the rewind mode, etc.) or the like in accordance with a manipulation thereof by the user. A capstan motor driving unit 160 can drive the capstan motor 40 to rotate the supply reel 12 or take-up reel 14 at a speed set in accordance with a selected one of the operation modes. A loading motor driving unit 180 is also provided that serves to drive a loading motor 190 for loading and unloading of a tape cassette. The loading motor driving unit 180 also can move the function plate 200 to a position set in accordance with a selected one of the operation modes by driving the loading motor 190, which allows the tension brake 60 and the first and second brake units 62 and 64 to control respective rotating speeds of the supply reel 12 and take-up reel 14 while controlling the tension of the tape.

The control unit 100 preferably controls the capstan motor driving unit 160 and the loading motor driving unit 180 in response to various inputs from the key input unit 140 or the like respectively associated with the operation modes. Such controls are preferably carried out based on detection signals from the remaining tape amount sensors 110 and 120, a detection signal from the capstan motor RPM detecting unit 130, and a count signal from a counter 150 adapted to count the lapse of time in accordance with system clock signals.

Preferred embodiments of the present invention can be based on the exemplary relation between the rotating speed and time exhibited when the rotating speed of the supply reel 12 or take-up reel 14 is reduced by braking. An exemplary relation between the rotating speed and time that has the form of a straight line with a negative slope is exhibited when the rotating speed of the supply reel 12 or take-up reel 14 is reduced at a constant reduction rate by use of the brake unit adapted to control the rotating speed of an associated one of the supply reel 12 and take-up reel 14 (for example, the second brake unit 64 in the case of the take-up reel 14). However, the present invention is not intended to be so limited.

In accordance with preferred embodiments, the rotating speed and time of the capstan motor are detected at least two times during a speed reduction carried out by the brake operations. The detected data can be used to derive the time at which a desired rotating speed is obtained. After stopping of the braking operation, the capstan motor is operated again at a desired rotating speed (e.g., a rotating speed enough low to generate no damage to the tape T when abruptly stopped).

Figure 5:
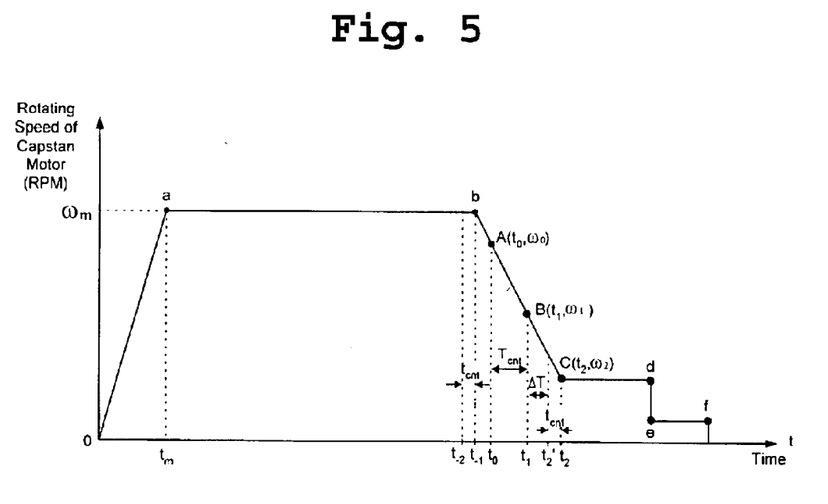
FIG. 5 is a graph that shows an exemplary tape speed controlling method according to the present invention.

As shown in FIG. 5, the point b is the point of time when the brake adapted to control the rotating speed of an associated one of the supply reel 12 and take-up reel 14 begins to operate. As shown in FIG. 5, the point A represents the point of time when the rotating speed of the capstan motor 40 is primarily observed, whereas the point B represents the point of time when the rotating speed of the capstan motor 40 is secondarily observed. FIG. 5 is a diagram that shows an exemplary tape speed according to preferred embodiments of the present invention. The point C can be the point of time when the rotating speed of the capstan motor 40 reaches a reduction target speed. The reduction target speed is preferably a speed in which even when the operation of winding the tape around one of the take-up reel or supply reel is abruptly stopped caused by, for example, a complete tape winding, the tension of the tape does not increase to a level capable of generating damage to the tape at the other reel.

Figure 6:
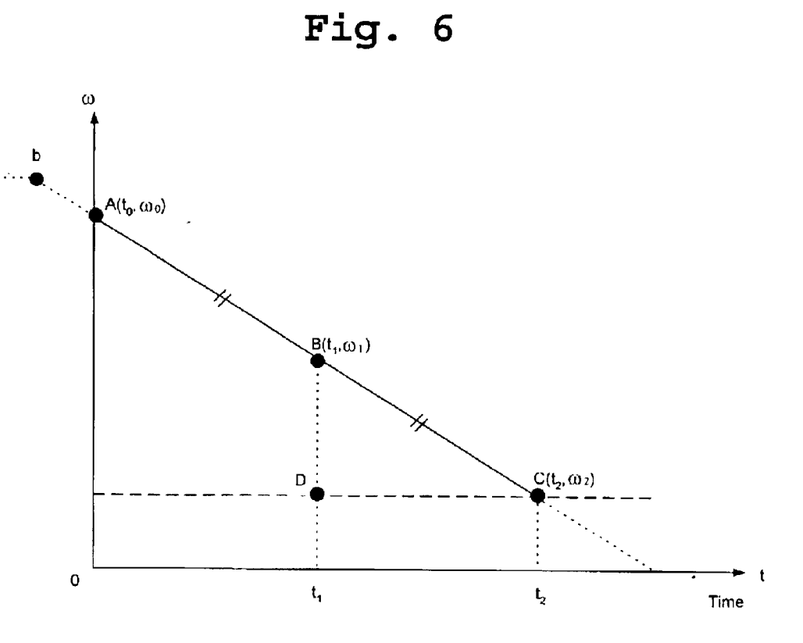
FIG. 6 is a graph illustrating an exemplary time-speed relation in a speed reduction operation according to the present invention.

The equation of the straight line A–C can be expressed as follows: $\omega - \omega_0 = (\omega_1 - \omega_0) t/(t_1 - t_0)$. As shown in FIG. 6, it can be assumed that $t_0 = 0$. When this equation is arranged with respect to "t", $t = (\omega - \omega_0) t_1 / (\omega_1 - \omega_0)$.

If $t = t_2$, equation (1) can be obtained as follows:

$$t_2 = (\omega_2 - \omega_0) t_1 / (\omega_1 - \omega_0) \tag{1}$$

Figure 7:
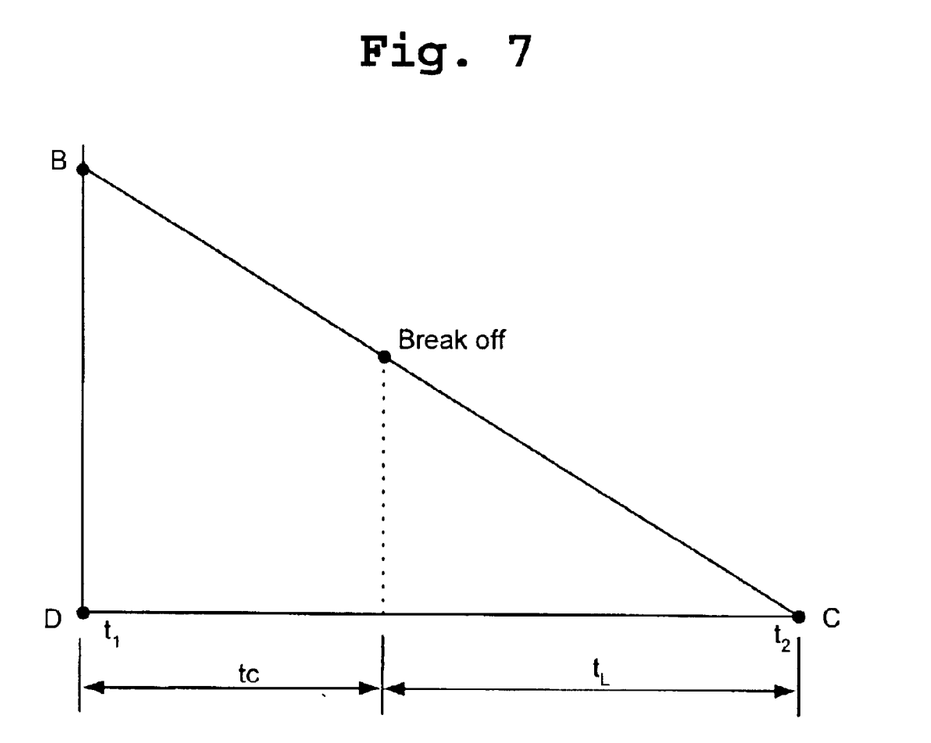
FIG. 7 is a graph illustrating an exemplary braking operation according to operations of a loading motor in accordance with preferred embodiments of the present invention.

As shown in FIG. 7, "$t_C$" represents the time for which the braking state is maintained, whereas "$t_L$" represents the time taken to release the braking state or the time taken until the brake, which is in operation in accordance with the driving operation of the loading motor, stops the braking operation. These times $t_C$ and $t_L$ have a relation that $t_2 - t_1 = t_C + t_L$.

Therefore, equation (2) can be obtained as follows:

$$t_C = t_2 - t_1 - t_L \tag{2}$$

Based on the equations (1) and (2), equation (3) can be established as follows:

$$t_C = (\omega_2 - \omega_1)(t_1 - t_L)/(\omega_1 - \omega_0) \tag{3}$$

However, "$t_L$" is preferably determined in accordance with the characteristics of the associated set or magnetic tape recording/reproducing apparatus, for example, as described above. This is because the time $t_L$ is the time taken until the braking operation is released as the function plate 200 is moved to a braking operation releasing position in accordance with the control operation of the control unit 100, which controls the loading motor driving unit 180 to transmit the driving force from the loading motor 190 to the function plate 200.

The time $t_C$ can be determined using the equation (3) after deriving "$\omega_0$" and "$\omega_1$", and then measuring "$t_1$". Accordingly, the point of time when "$\omega_2$", a desired rotating speed, is obtained can be accurately found irrespective of surrounding conditions. That is, the rotating speed of the capstan motor 40 can be accurately reduced to the desired rotating speed $\omega_2$, so that the tape T can then be safely wound at the reduced, constant rotating speed.

Figure 4A:
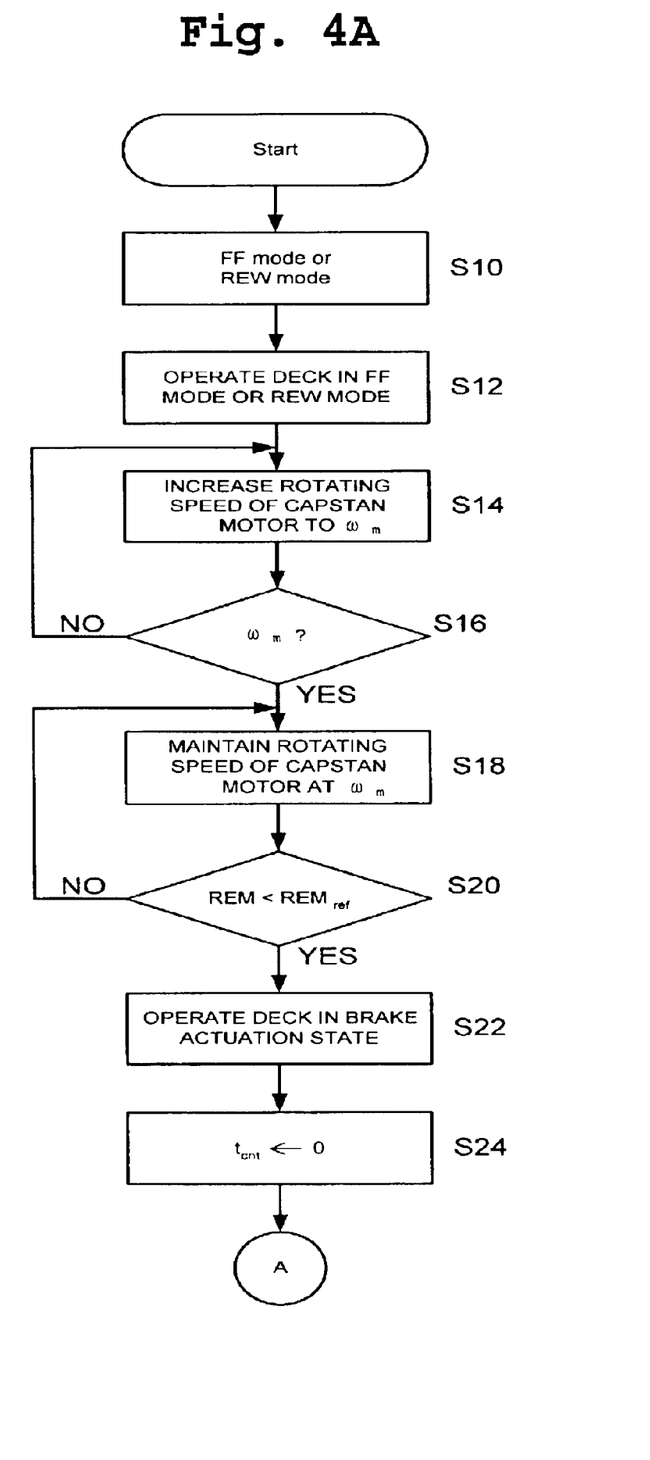
FIGS. 4A to 4C are flow charts respectively illustrating a preferred embodiment of a method for controlling a tape speed in a magnetic tape recording/reproducing apparatus according to the present invention.
Figure 4B:
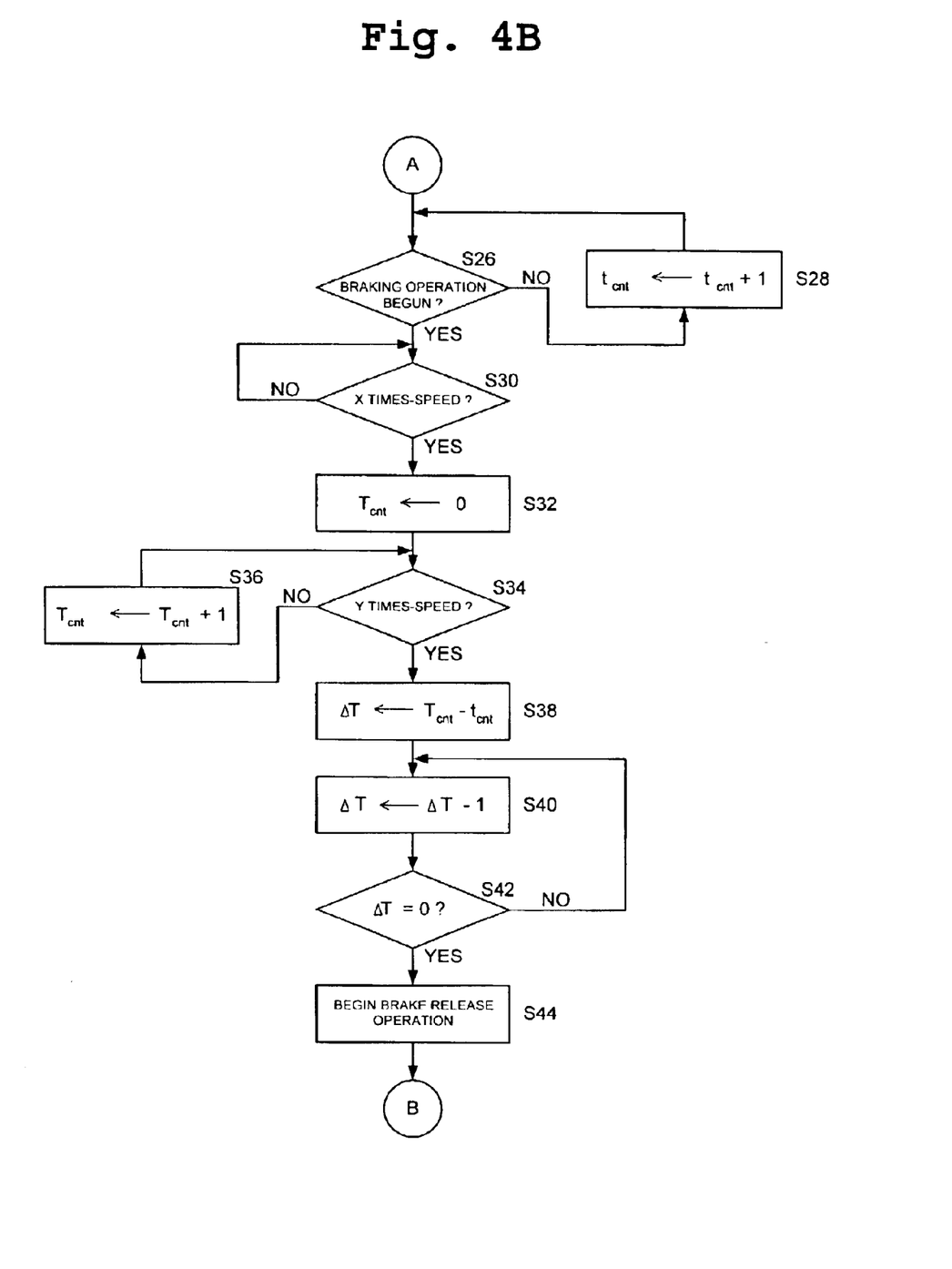
Figure 4C:
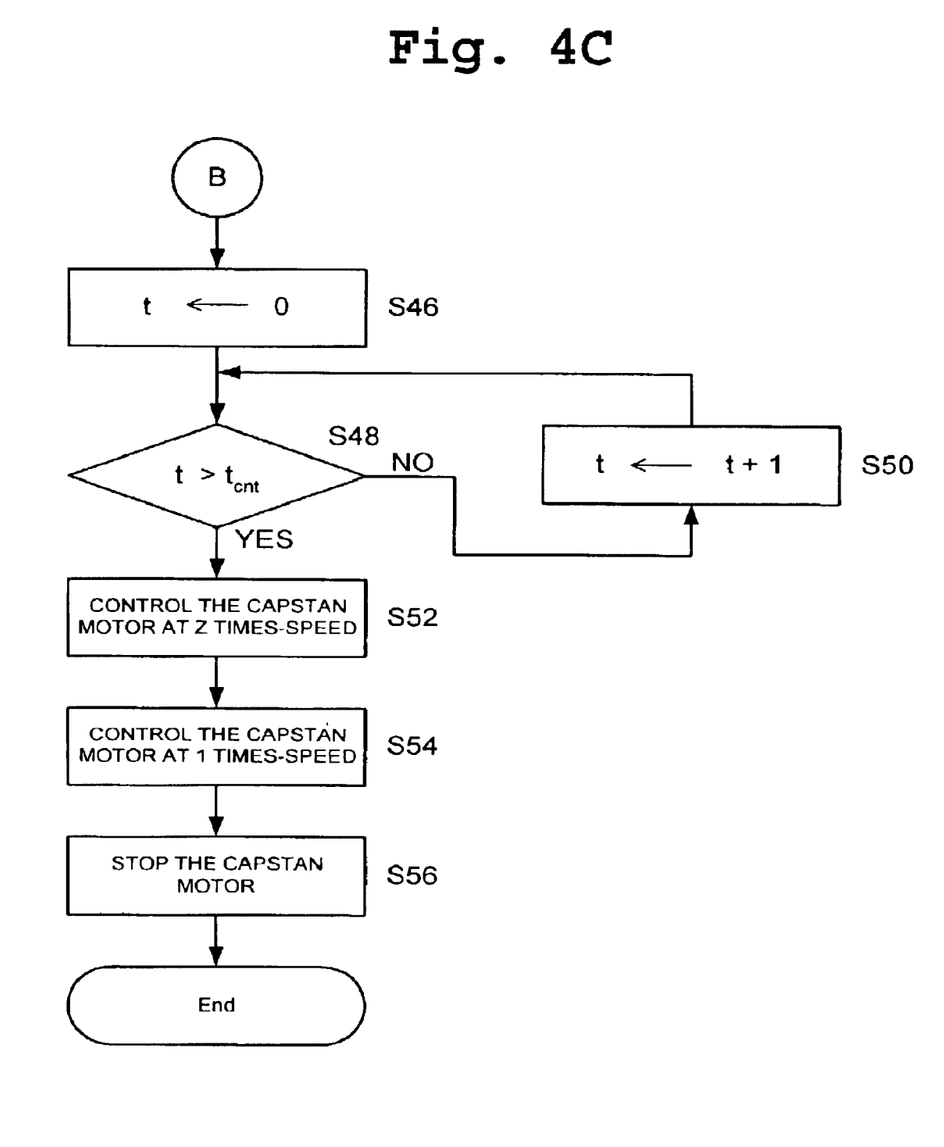

A preferred embodiment of the speed control method according to the present invention will now be described. As shown in FIGS. 4A to 4C, the preferred embodiment of a speed control method in a high-speed winding mode can be performed and will now be described using each magnetic tape recording/reproducing apparatus as shown in FIGS. 2–3. The flow charts of FIGS. 4A to 4C illustrate one exemplary case of sensing the speeds $\omega_0$ and $\omega_1$ causing the time interval of "t1–t0" from the point A (the primary speed sensing point) to the point B (the secondary speed sensing point) to be substantially equal to the time interval of "t2–t1"

from the point B to the point C (the target speed point). However, the present invention is not intended to be so limited.

After a process starts as shown in FIG. 4A, when the high-speed winding mode (e.g., FF/REW mode) is selected by the user in accordance with an associated input from the key input unit 140, the control unit 100 preferably controls the loading motor driving unit 180 to cause the function plate 200 to be moved to an initial position associated with the selected high-speed winding mode (e.g., the FF/REW mode) in accordance with an operation of the loading motor 190 (Step S10). Accordingly, the deck can be driven in a high-speed winding mode (Step S12).

The control unit 100 then controls the capstan motor driving unit 160 to abruptly increase the rotating speed of the capstan motor 40 preferably until a desired target speed $\omega_m$ (for example, a 500 times-speed) is obtained (Step S14). The control unit 100 can determine whether the rotating speed of the capstan motor 40 reaches the target speed $\omega_m$ (Step S16). Steps S14 and S16 are preferably repeated until the target speed $\omega_m$ is reached.

In the high-speed winding mode, the tape T is run along a running path under the condition in which the slant bases 26 and 26' are positioned at a position retracted from the head drum 30 such as indicated by the phantom line in FIG. 2. The driving force for running the tape T can be provided by the capstan motor 40, and selectively transmitted to the supply reel 12 or take-up reel 14 via the clutch assembly 50. When the driving force from the capstan motor 40 is transmitted to the take-up reel 14, the tape wound around the supply tape reel is preferably unwound, and then wound around the take-up tape reel. When the driving force from the capstan motor 40 is transmitted to the supply reel 12, the tape wound around the take-up tape reel is preferably unwound, and then wound around the supply tape reel.

When the rotating speed of the capstan motor 40 reaches the target speed $\omega_m$ (e.g., "a" in FIG. 5), the control unit 100 preferably controls the capstan motor driving unit 160 so that the capstan motor 40 maintains the target speed $\omega_m$ (Step S18). Subsequently, the control unit 100 can analyze a remaining tape amount detection signal received from the driven reel-side remaining tape amount sensor (e.g., the supply reel-side remaining tape amount sensor 110 in the FF mode, or the take-up reel-side remaining tape amount sensor 120 in the REW mode), to determine whether the remaining tape amount REM reaches a predetermined reference value $REM_{ref}$ (Step S20). Here, the reference remaining tape amount $REM_{ref}$ does not correspond to the remaining tape amount at which the brake begins to operate. The reference remaining tape amount $REM_{ref}$ preferably takes into consideration the tape amount additionally unwound at the rotating speed $\omega_m$ until a braking effect is actually exhibited by the deck or tape running system 20. The reference remaining tape amount $REM_{ref}$ can be determined using a function, empirically or the like.

When the remaining tape amount REM reaches the predetermined reference value $REM_{ref}$ (step S20-yes), the control unit 100 can control the loading motor driving unit 180 to move the function plate 200 to a position corresponding to a final stage of the high-speed winding mode (that is, the FF mode or REW mode) in accordance with an operation of the loading motor 190. Accordingly, the deck preferably operates in a brake actuation state at the final stage of the high-speed winding mode (at the time point $t_{-2}$ in FIG. 5) (Step S22). For example, where the high-speed winding mode is the REW mode, the second brake 64 abruptly reduces the rotating speed of the take-up reel 14 while coming into close contact with the take-up reel 14 when the deck operates in the brake actuation state at the final stage of the REW mode.

Concurrently, the control unit 100 can control the counter 150 to set a count value $t_{cnt}$ to be 0 (Step S24), and then to start its count operation.

The control unit 100 can check whether the brake begins to operate under the control of the loading motor driving unit 180 (Step S26), and count-up the count value $t_{cnt}$ until it is determined that the brake begins to operate (Step S28). When the brake begins to operate, the rotating speed of the capstan motor 40 detected by the capstan motor RPM detecting unit 130 is reduced. The point of time when the rotating speed reduction begins is preferably the braking operation beginning point. In this manner, the beginning of the braking operation can be made at the point b in FIG. 5 corresponding to the point of time $t_{-1}$.

When the control unit 100 determines the beginning of the braking operation, it temporarily can store the counted-up count value $t_{cnt}$ in an internal register or the like. The control unit 100 then can check, preferably based on a detection signal received from the capstan motor RPM detecting unit 130, whether the rotating speed of the capstan motor 40 reaches a predetermined X times-speed (e.g., the rotating speed $\omega_0$ at the point A in FIG. 5, for example, a 11-times speed) in accordance with the braking operation (Step S30).

When it is determined that the rotating speed of the capstan motor 40 reaches "$\omega_0$" (e.g., X times-speed), the control unit 100 preferably controls the counter 150 to set a count value $T_{cnt}$ to be 0 (Step S32), and then to start its count operation.

The control unit 100 then can check, preferably based on a detection signal received from the capstan motor RPM detecting unit 130, whether the rotating speed of the capstan motor 40 reaches a predetermined Y times-speed (e.g., the rotating speed $\omega_1$ at the point B in FIG. 5, for example, an 8-times speed) in accordance with the continued braking operation (Step S34). Also, the control unit 100 counts-up the count value $T_{cnt}$ until the rotating speed of the capstan motor 40 reaches "$\omega_1$" (Y times-speed) (Step S36).

When the rotating speed of the capstan motor 40 reaches "$\omega_1$" (Y times-speed), the control unit 100 can calculate the time taken until a brake release actuation is begun in order to obtain a target speed, that is, a Z times-speed (e.g., the rotating speed $\omega_2$ at the point C in FIG. 5, for example, a 5-times speed) or until the point of time $t_2'$ as shown in FIG. 5 (Step S38). FIG. 5 shows an exemplary relationship (e.g., negative constant slope) for the time period b-C. However, the present invention is not intended to be so limited. For example, the period b-C can have a prescribed non-linear relationship or a period $t_2$-$t_2$ could be non-linear or a curve approaching $\omega_2$.

Preferably, when the count value $t_{cnt}$ counted at step S28, that is, the time taken for the deck to activate the brake (the interval between the time points $t_{-2}$ and $t_{-1}$ in FIG. 5) is deducted from the count value $T_{cnt}$ counted at step S36, that is, the interval $t_1$-$t_0$ between the points A and B in FIG. 5, the interval between $t_1$ and $t_2'$, $\Delta T$, is derived. This is because the interval $t_1$-$t_0$ between the points A and B is preferably substantially equal (e.g., in a prescribed relationship) to the interval between the points B and C, and the time taken for the function plate 200 to move to the brake actuation position in accordance with the driving of the loading motor 190 under the control of the loading motor driving unit 180 is substantially equal to the time taken for the function plate 200 to move to the brake release position.

Thereafter, the control unit 100 preferably controls the counter 150 to perform a countdown operation until the time ΔT calculated as described above corresponds to 0 (Steps S40 and S42). When the time ΔT corresponds to 0, the control unit 100 can control the loading motor driving unit 180 so that the loading motor 190 is driven to move the function plate 200 to the brake release position (Step S44). Concurrently or simultaneously, the control unit 100 controls the counter 150 to set a count value t to be 0 (Step S46), and then to start its count operation.

The control unit 100 then checks whether or not the count value t corresponds to the time $t_{cnt}$ taken to release the braking operation (Step S48). That is, the counted value t is counted up until the braking operation is released (Step S50).

When the count value t corresponds to "$t_{cnt}$", the control unit 100 controls the capstan motor driving unit 160 so that the capstan motor 40 rotates at a constant speed corresponding to the Z times-speed (for example, a 5 times-speed) (Step S52).

Subsequent operations can be carried out in a similar manner as those in the speed reduction control. That is, when the rotation at the Z times-speed is continued for a predetermined time (e.g., the interval C-d in FIG. 5), the control unit 100 controls the capstan motor driving unit 160 so that the capstan motor 40 rotates at a constant speed corresponding to, for example, a 1 time-speed, for a predetermined time (e.g., the interval e-f in FIG. 5) (Step S54). Thereafter, the control unit 100 controls the capstan motor driving unit 160 to stop the capstan motor 40 (Step S56).

Figure 8:
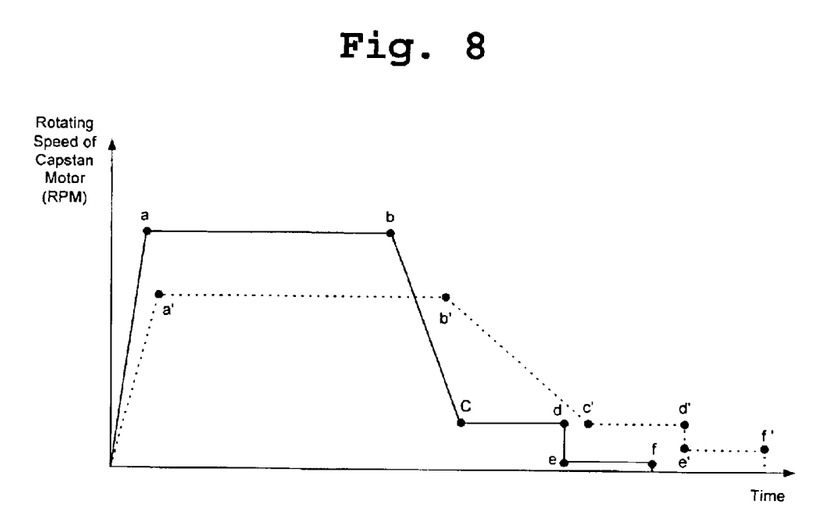
FIG. 8 is a diagram that shows an exemplary speed graph according to a preferred embodiment of a speed control method according to the present invention.

FIG. 8 is a diagram that shows the time taken to reduce the rotating speed of the capstan motor at the final stage of the high-speed winding mode in accordance with the method of FIGS. 4A–4C. As shown in FIG. 8, the reduction time taken in accordance with the preferred embodiments according to the present invention as indicated by the solid line is less than the reduction time taken in the method of FIG. 1 shown by the phantom line. Further, the high-speed winding speed (e.g., a) can be higher than the method of FIG. 1. Thus, a rapid high-speed winding operation can be achieved in accordance with preferred embodiments of the present invention. Further, the tape coupled between the reels is not subjected to any high tension in accordance with the preferred embodiments, and it is possible to more rapidly wind the tape without causing any damage to the tape. In accordance with the preferred embodiments according to present invention, it is also possible to always and stably obtain a target reduction speed in spite of a variation in surrounding conditions such as the torque of the brake, the load deviation of the reel driving unit or running system in the deck, the load characteristics of the cassette, and temperature and moisture.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus comprising:
   a supply mechanism configured to operate in a high speed winding mode and a fast forward/rewind mode;
   a driving motor configured to drive the supply mechanism at a first speed in the high speed winding mode,
   wherein the first speed is higher than a speed in the fast forward/rewind mode;
   a brake mechanism that reduces a speed of the supply mechanism from the first speed to a second speed;
   a control circuit that controls the brake mechanism during the reduction of the supply mechanism speed from the first speed to the second speed,
   and wherein the brake mechanism releases a brake from the supply mechanism before the supply mechanism reaches the second speed.

2. The apparatus of claim 1, wherein the high speed winding mode of the supply mechanism is capable of transferring a tape from a take-up tape reel to a supply tape reel in less than one minute.

3. The apparatus of claim 1, wherein the high speed winding mode of the supply mechanism is capable of transferring a tape more than 2 times faster than a fast forward/rewind mode.

4. The apparatus of claim 1, wherein the control circuit determines a braking interval for the brake mechanism to reduce the speed of the supply mechanism from the first speed to the second speed.

5. The apparatus of claim 4, wherein the control circuit determines a starting point and a release point of the brake mechanism for the braking interval.

6. The apparatus of claim 5, comprising a sensor that senses a speed of the driving reel portion, wherein the sensor is coupled to the control circuit, and wherein the control circuit determines the release point of the braking mechanism by receiving at least first and second signals representing the speed of the driving reel portion during the braking interval.

7. The apparatus of claim 6, wherein the control circuit determines the release point using the at first and second signals to calculate a speed changing relationship during the braking interval.

8. The apparatus of claim 7, wherein the rotating speed relative to the relationship of the supply mechanism in the braking interval is a prescribed relationship.

9. The apparatus of claim 8, wherein the prescribed relationship is a line having a substantially constant negative slope.

10. The apparatus of claim 8, wherein a time between the first speed signal and the second speed signal is approximately equal to a time between the second speed signal and a time the supply mechanism is at the second speed.

11. The apparatus of claim 10, wherein the control circuit determines the release point using a second period, wherein the second period is substantially a time between when the brake mechanism receives a termination signal and a braking force is released from the driving reel portion.

12. The apparatus of claim 11, wherein the apparatus is a tape recording/reproducing device, wherein a speed difference between a value of the first and second speed signals is approximately equal to a speed difference between the value of the second speed signal and the second speed, and wherein a time to apply the brake mechanism is substantially equal to a time to release the brake mechanism.

13. The apparatus of claim 11, wherein the supply mechanism has a driving reel portion and a driven reel portion configured to engage a tape cassette, wherein the starting point is determined based on a signal representing an amount of tape remaining that corresponds to the driven reel portion, wherein the signal is determined taking into consideration an amount of rotating by the driven reel during a first period between when the brake mechanism begins to operate and a braking force is applied to the driving reel portion.

14. The apparatus of claim 1, wherein the brake mechanism reduces the speed of the supply mechanism from the second speed to a stopped status.

15. A method, comprising:
   driving a capstan motor at a first speed;
   braking to reduce the speed of the capstan motor to a second speed;
   releasing the braking operation so that the capstan motor substantially achieves the second speed, wherein the first speed is higher than the second speed, wherein both the first and second speed are greater than a play mode speed.

16. A method for controlling operations in a high-speed winding mode for a recording/reproducing apparatus that includes supply and take-up reels adapted to rotate selectively in accordance with a driving force from a motor, the method comprising:
   performing high-speed winding by increasing the rotating speed of the motor to a target speed according to a high-speed winding request;
   braking while calculating a point of time when the rotating speed of the motor reaches a reduction target speed, and releasing the braking on the basis of the calculated point of time; and
   stopping the motor after driving the motor at the reduction target speed during a desired time, wherein the braking and releasing the braking comprises releasing the braking from the motor at a predetermined point of time before the calculated point of time so that the rotating speed of the motor substantially operates at the reduction target speed.

17. The method according to claim 16, wherein the braking and releasing the braking, comprises:
   (a) determining a starting point of time when the braking is to operate during the high-speed winding operation at the target speed;
   (b) beginning the braking at the starting operating point to reduce the rotating speed of the motor;
   (c) sensing at least first and second rotating speeds of the motor and a corresponding first and second point of time during the braking; and
   (d) determining the calculated point of time when the rotating speed of the motor reaches the reduction target speed based on the first and second sensed rotating speeds of the motor and the first and second points of time.

18. The method according to claim 17, wherein the starting point of time is determined based on a signal that corresponds to an amount of the tape remaining on a driven-side one of a supply and take-up tape reels.

19. The method according to claim 18, further comprising measuring a first period until a braking force is applied to the supply or take-up reel after the braking begins to operate, wherein the signal is determined taking into consideration the first period.

20. The method according to claim 19, wherein the predetermined point of time is calculated by deducting the first period for the operation of the braking force from the calculated point of time when the rotating speed of the motor substantially operates at the reduction target speed.

21. The method according to claim 17, wherein the at least first and second sensed speeds are used to determine a relationship of speed to time of the motor during braking.

22. The method of claim 16, wherein said stopping comprises braking until the rotating of the motor is stopped.

23. An apparatus, comprising:
   a supply mechanism configured to operate in a high speed winding mode and a fast forward/rewind mode;
   a driving motor configured to drive the supply mechanism at a first speed in the high speed winding mode, wherein the first speed is higher than a speed in the fast forward/rewind mode;
   a brake mechanism having at least one brake unit that brakes to the supply mechanism in the high speed winding mode at a first point and releases from the supply mechanism at a second point; and
   a control circuit that calculates the second point before the supply mechanism reaches to a second speed.

* * * * *